(12) United States Patent
Smith et al.

(10) Patent No.: US 11,725,613 B2
(45) Date of Patent: Aug. 15, 2023

(54) FUEL HEATING APPARATUS AND METHODS

(71) Applicant: CT Energy Holdings, LLC, Franklin, TN (US)

(72) Inventors: Todd E. Smith, Franklin, TN (US); Calvin Whitaker, Milwaukee, WI (US); Frederick M. Shofner, Wartrace, TN (US); Rick P. Dye, Shelbyville, TN (US)

(73) Assignee: CT Energy Holdings, LLC, Franklin, TN (US)

( * ) Notice: Subject to any disclaimer, the term of this patent is extended or adjusted under 35 U.S.C. 154(b) by 0 days.

(21) Appl. No.: 16/357,922

(22) Filed: Mar. 19, 2019

(65) Prior Publication Data

US 2019/0211781 A1 Jul. 11, 2019

Related U.S. Application Data

(63) Continuation of application No. 15/446,475, filed on Mar. 1, 2017, now Pat. No. 10,233,874.
(Continued)

(51) Int. Cl.
*F02M 31/16* (2006.01)
*F02M 31/125* (2006.01)
(Continued)

(52) U.S. Cl.
CPC .......... *F02M 31/16* (2013.01); *B01D 35/005* (2013.01); *B01D 35/18* (2013.01); *F01P 7/14* (2013.01);
(Continued)

(58) Field of Classification Search
CPC .... F02M 31/16; F02M 37/30; F02M 37/0023; F02M 37/0035; F02M 37/0052; B01D 35/005; B01D 35/18
(Continued)

(56) References Cited

U.S. PATENT DOCUMENTS 2,599,699 A 6/1952 Dilworth et al.
2,635,174 A 4/1953 Kasten
(Continued)

FOREIGN PATENT DOCUMENTS

DE 3538282 A1 4/1987
EP 1188468 A1 * 3/2002 ........... B01D 29/114
(Continued)

OTHER PUBLICATIONS

EP1188468A1 (Ben Amor et al.) (Mar. 20, 2002) (Machine Translation) (Year: 2002).*
(Continued)

*Primary Examiner* — Mahmoud Gimie

(57) ABSTRACT

A method of improving fuel efficiency in a diesel fuel internal combustion engine on a vehicle includes providing a combustion system including a fuel tank, an engine, and a fuel line disposed between the fuel tank and the engine. A heat exchanger is positioned on the fuel line between the fuel tank and the engine. Working thermal fluid is passed from a reservoir through the heat exchanger while fuel is passed through the heat exchanger, increasing the temperature of the fuel passing through the heat exchanger. A vibration isolation mount is installed between the heat exchanger and the vehicle, thereby reducing vibration of the heat exchanger during use of the vehicle. Heated fuel from the heat exchanger is delivered to the engine, improving the fuel efficiency of the engine by burning the heated fuel.

17 Claims, 13 Drawing Sheets

Related U.S. Application Data

(60) Provisional application No. 62/389,532, filed on Mar. 1, 2016, provisional application No. 62/498,929, filed on Jan. 12, 2017.

(51) Int. Cl.
  *B01D 35/18* (2006.01)
  *F02M 37/30* (2019.01)
  *F02M 37/00* (2006.01)
  *B01D 35/00* (2006.01)
  *F02M 37/32* (2019.01)
  *F01P 7/14* (2006.01)

(52) U.S. Cl.
  CPC ...... *F02M 31/125* (2013.01); *F02M 37/0023* (2013.01); *F02M 37/0035* (2013.01); *F02M 37/0052* (2013.01); *F02M 37/30* (2019.01); *F02M 37/32* (2019.01); *Y02T 10/12* (2013.01)

(58) Field of Classification Search
  USPC ........................................................ 123/557
  See application file for complete search history.

(56) References Cited

U.S. PATENT DOCUMENTS

| | | | |
|---|---|---|---|
| 3,235,084 A | | 2/1966 | King et al. |
| 3,929,187 A | * | 12/1975 | Humer .................. F02M 31/16 165/52 |
| 3,935,901 A | | 2/1976 | Virgil |
| 4,146,002 A | * | 3/1979 | Quinn .................. F02M 31/16 123/557 |
| 4,343,283 A | | 8/1982 | Sheperd |
| 4,393,851 A | * | 7/1983 | Gorans ................. F02M 31/16 123/552 |
| 4,404,949 A | | 9/1983 | Bell |
| 4,411,240 A | * | 10/1983 | Kravetz ................. F01P 11/20 123/142.5 E |
| 4,424,776 A | | 1/1984 | Mien |
| 4,442,819 A | | 4/1984 | Veach |
| 4,454,851 A | | 6/1984 | Bourbonnaud et al. |
| 4,477,715 A | * | 10/1984 | Bell ..................... F02M 31/125 219/205 |
| 4,501,255 A | | 2/1985 | Van Der Ploeg et al. |
| 4,516,556 A | | 5/1985 | Meyer |
| 4,538,697 A | * | 9/1985 | Muroi .................... B60K 11/04 180/300 |
| 4,662,432 A | * | 5/1987 | Suzuki .................... F16F 7/108 165/41 |
| 4,997,555 A | | 3/1991 | Church et al. |
| 5,411,005 A | * | 5/1995 | Bohl ..................... F02M 31/10 123/557 |
| 5,443,053 A | | 8/1995 | Johnson |
| 6,289,879 B1 | | 9/2001 | Clausen et al. |
| 6,328,883 B1 | | 12/2001 | Jensen |
| 6,584,777 B1 | * | 7/2003 | Clarke ..................... F02C 9/28 60/776 |
| 7,861,988 B2 | | 1/2011 | Hamida et al. |
| 9,592,461 B2 | | 3/2017 | Roesgen et al. |
| 2002/0074419 A1 | | 6/2002 | Duffer et al. |
| 2008/0037967 A1 | | 2/2008 | Fasold et al. |
| 2008/0296288 A1 | | 12/2008 | Girondi |
| 2010/0229808 A1 | * | 9/2010 | Demmith ............... F02M 31/16 123/41.01 |
| 2011/0259300 A1 | | 10/2011 | Anetsberger et al. |
| 2014/0209070 A1 | * | 7/2014 | Gleeson ................. F02M 21/06 123/543 |
| 2014/0353230 A1 | | 12/2014 | Klein et al. |
| 2016/0138534 A1 | | 5/2016 | Ham et al. |
| 2016/0273455 A1 | | 9/2016 | Fausett et al. |
| 2016/0311552 A1 | | 10/2016 | Fausett et al. |

FOREIGN PATENT DOCUMENTS

| | | | |
|---|---|---|---|
| JP | 09195887 A | * | 7/1997 |
| JP | 2014227894 A | | 12/2014 |
| KR | 101189226 B1 | | 10/2012 |

OTHER PUBLICATIONS

International Search Report and Written Opinion for PCT/US2017/020248, dated May 29, 2017, 21 pages.

Cheng, Jensen P., Landman, Larry C., and Wagner, Robert D.; A Study of the Relationship Between Exhaust Emissions and Fuel Economy; May 1983; 581 pages; prepared by U.S. Environmental Protection Agency.

* cited by examiner

FUEL HEATING APPARATUS AND METHODS

CROSS-REFERENCES TO RELATED APPLICATIONS

This application is a continuation of and claims the benefit of and priority to co-pending U.S. patent application Ser. No. 15/446,475 filed Mar. 1, 2017, entitled FUEL HEATING APPARATUS AND METHODS, which is a non-provisional of Provisional U.S. Patent Application No. 62/389,532 and is also a non-provisional of Provisional U.S. Patent Application No. 62/498,929, all of which are hereby incorporated by reference in their entireties.

BACKGROUND

The invention relates to combustion engines and more particularly to fuel heating systems for internal combustion engines.

Vehicles with internal combustion engines such as transport trucks typically include a fuel tank supplying fuel to an engine by a fuel line. One or more fuel filters are positioned along the fuel line between the fuel tank and the engine to filter debris or contaminants from the fuel before the fuel enters the engine. Fuel filters of this nature are generally removable so they can be replaced at regular service intervals or when they become clogged. When operating in cold climates, fuel, and especially diesel fuel, has a tendency to thicken and become clogged in a fuel filter. This phenomenon is referred to as gelling of the fuel.

Currently, when diesel fuel gels in cold climates it clogs up the fuel filters when the vehicle either is off, at idle, or in operation and can prevent a vehicle from starting during a cold start or can quickly shut a vehicle down. For example, if a vehicle encounters a cold front while in operation, the fuel in the fuel filter may gel and prevent proper operation of the fuel system. Similarly, if a vehicle is started in a cold start condition, gelled fuel in the fuel filter may prevent the vehicle from properly starting. There are many variables to gelling of fuel, and water and wax clogging of the filter media in cold temperatures is one effect of gelling that starves the engine of fuel. The impact of this gelling process is a costly and time consuming endeavor including towing costs, downtime, replacement filters, service costs, and contractual penalties for delays placed on the shipping company for late deliveries.

Others have attempted to overcome the problem of gelling of fuel in fuel filters on vehicles by providing heating elements on the exterior of the fuel filter. For example, others have provided external wraps that apply to the exterior of a fuel filter housing. However, such external devices are often ineffective at solving the problems of preventing gelling because they do not provide adequate heat to the interior of the fuel filter to prevent gelling. Heating devices placed on the exterior of a fuel filter lose much of the applied heat outwardly to the ambient environment.

Another problem associated with fuel heating systems in vehicles includes reduction of fuel efficiency in various operating conditions. It has been observed through research that when a vehicle engine is first started, especially during the first two to four hours of operation, the fuel economy achieved is lower than the fuel economy achieved after the fuel temperature reaches a higher level. Experimental observations also reveal that fuel temperature delivered to the engine in vehicles is generally not regulated. Additionally, the temperatures at which fuel is stored in underground tanks may vary significantly from ambient operating temperatures encountered during use. This leads to wide variance in incoming fuel temperatures delivered to the engine for combustion. It is observed that unregulated incoming fuel temperature may contribute to variance in fuel efficiency across diverse operating conditions.

What is needed, then are improvements in devices and methods for preventing gelling of fuel in fuel delivery systems, and also improvements in devices and methods for improving fuel efficiency.

BRIEF SUMMARY

The present disclosure provides an apparatus and methods for use with fuel delivery systems, and particularly for use with internal combustion engines in vehicles such as cars and trucks, and other applications such as in engines for barges, aircraft, watercraft, heavy equipment, locomotives and stationary power generation. The fuel heating apparatus includes a fuel tank, an engine, and a fuel line disposed between the fuel tank and the engine. One or more fuel filters are disposed along the fuel line. The fuel line connects to an inlet on a fuel filter head on one side, and also connects to an outlet on the fuel filter head on the other side. A removable fuel filter is securable to the fuel filter using a mechanical engagement such as a threaded connection. Fuel travelling through the fuel line from the fuel tank to the engine enters the fuel filter head, passes into the fuel filter into an uncleaned or unfiltered fuel plenum, passes across a filter medium, enters a cleaned or filtered fuel plenum inside the fuel filter, exits the fuel filter back into the fuel filter head, re-enters the fuel line and travels to the engine. As the fuel passes across the filter medium inside the fuel filter, contaminants and debris are removed from the fuel.

One aspect of the present disclosure provides a fuel heating system including a fuel filter head having a support rod extending from the fuel filter attachment location, and a heating element is disposed on the support rod. The heating element includes one or more electrical leads passing through the support rod and out the fuel filter head for attachment to an electronic control. The heating element is positioned on the support rod to reside inside the clean fuel plenum on the fuel filter when the fuel filter is installed on the fuel filter head. The heating element is operable to heat the fuel filter to prevent gelling of the fuel inside the fuel filter. The heating element may be operated while the vehicle is moving or when the vehicle is stationary.

In some embodiments, such as in diesel trucks, multiple fuel filters are positioned in parallel or in series on a fuel line, and each fuel filter head includes a separate support rod and heating element positioned to reside inside the fuel filter when the fuel filter is installed on the fuel filter head to provide controlled heating to prevent gelling of fuel in each fuel filter.

In additional embodiments, the present disclosure provides a fuel heating system including a fuel filter having a filter medium disposed on the interior of the fuel filter. The filter medium includes a metal screen. First and second electrical leads are attached to the metal screen, and the metal screen is operable as a resistance heating element on the interior of the fuel filter when current is passed through the first and second electrical leads across the metal screen. Thus, the fuel filter includes an integral heating element. Heat from the heating element warms the interior of the fuel filter and prevents gelling of the fuel in cold environments.

In additional embodiments, the present disclosure provides a fuel heating system including a temperature feedback control loop including a fuel filter head having a heating element extending from the fuel filter head such that the heating element resides on the interior of a fuel filter in the clean fuel plenum during use. The heating element includes at least one electrical lead passing out of the fuel filter head to an electronic circuit. A first temperature sensor such as a thermocouple is positioned on the fuel filter head, or alternatively on the heating element, or alternatively on a supporting structure between the fuel filter head and heating element. The first temperature sensor provides a measurement of the local temperature to a thermostat or temperature controller during use. A control switch allows a user to select a desired temperature for measurement by the first temperature sensor or to turn the unit on and off. The thermostat controls the flow of current to and operation of the heating element to provide a measured temperature in the desired range or at the desired value.

In some embodiments, a first temperature sensor such as a thermocouple is positioned to monitor temperature at the fuel inlet of the fuel filter head, and a second temperature sensor such as a thermocouple is positioned to monitor temperature at the fuel outlet of the fuel filter head. Each temperature sensor is connected to a thermostat or controller connected to the heating element to adjust the heating element operation until a desired measured temperature is reached.

Another aspect of the present disclosure provides a controlled fuel temperature apparatus and associated methods to regulate the temperature of fuel delivered to the engine for combustion. The controlled fuel temperature apparatus includes a fuel tank, an engine, and a fuel line disposed between the fuel tank and the engine. A fuel temperature regulator is positioned between the fuel tank and the engine to control the fuel temperature en route to the engine for combustion. The fuel temperature regulator includes a working thermal fluid passed through a heat exchanger in thermal contact with the fuel. The fuel being delivered to the engine passes through a heat exchanger through which the working thermal fluid also passes. Thermal energy is transferred between the working thermal fluid and the fuel to regulate the temperature of the fuel in a desired range or at a desired value. The temperature-regulated fuel exits the fuel temperature regulator and enters the engine downstream of the fuel temperature regulator.

In some embodiments, the fuel temperature regulator, or controlled fuel temperature module, is installed on a vehicle at a location accessible by a user. A bypass valve and bypass line may be disposed on fuel line around the device to allow a user to selectively engage or disengage the fuel temperature regulator. Additionally, a bypass valve and a bypass line are installed on the heat exchanger in some embodiments to selectively block the flow of the working thermal fluid through the heat exchanger at a user's discretion.

In further embodiments, the present disclosure provides a fuel heating apparatus including a fuel filter heater and a controlled fuel temperature module. The apparatus includes a combined unit including a fuel filter head having a heating element extending from the fuel filter head positioned to reside on the interior of a fuel filter in the clean fuel plenum. The combined unit of the apparatus also includes a heat exchanger through which the fuel is passed during flow of fuel through the fuel line. A working thermal fluid is also passed through the heat exchanger such that the temperature of the fuel travelling through the fuel line is regulated by the heat exchanger. The heating element inside the fuel filter also prevents gelling of the fuel.

In further embodiments, the present disclosure provides a method for reducing pollutant emissions from an internal combustion engine, including the steps of: (a) providing a system including a fuel tank, an engine, and a fuel line disposed between the fuel tank and the engine; (b) providing a heat exchanger on the fuel line between the fuel tank and the engine; (c) passing fuel from the fuel line through the heat exchanger; and (d) simultaneously passing working thermal fluid through the heat exchanger such that the working thermal fluid transfers heat to the fuel in the heat exchanger prior to delivery of the fuel to the engine for combustion.

In further embodiments, the present disclosure provides a method for increasing fuel efficiency from an internal combustion engine, including the steps of: (a) providing a system including a fuel tank, an engine, and a fuel line disposed between the fuel tank and the engine; (b) providing a heat exchanger on the fuel line between the fuel tank and the engine; (c) passing fuel from the fuel line through the heat exchanger; and (d) simultaneously passing working thermal fluid through the heat exchanger such that the working thermal fluid transfers heat to the fuel in the heat exchanger prior to delivery of the fuel to the engine for combustion.

A further objective of the present disclosure is to provide a fuel heating apparatus capable of improving fuel efficiency during operation of a combustion system by utilizing a heat exchanger to pre-heat fuel prior to delivery to the engine for combustion and also capable of preventing gelling of fuel in the fuel filter by heating the fuel filter.

Numerous other objects, features and advantages of the present invention will be readily apparent to those skilled in the art upon a reading of the following disclosure when taken in conjunction with the accompanying drawings

DETAILED DESCRIPTION

Figure 1:
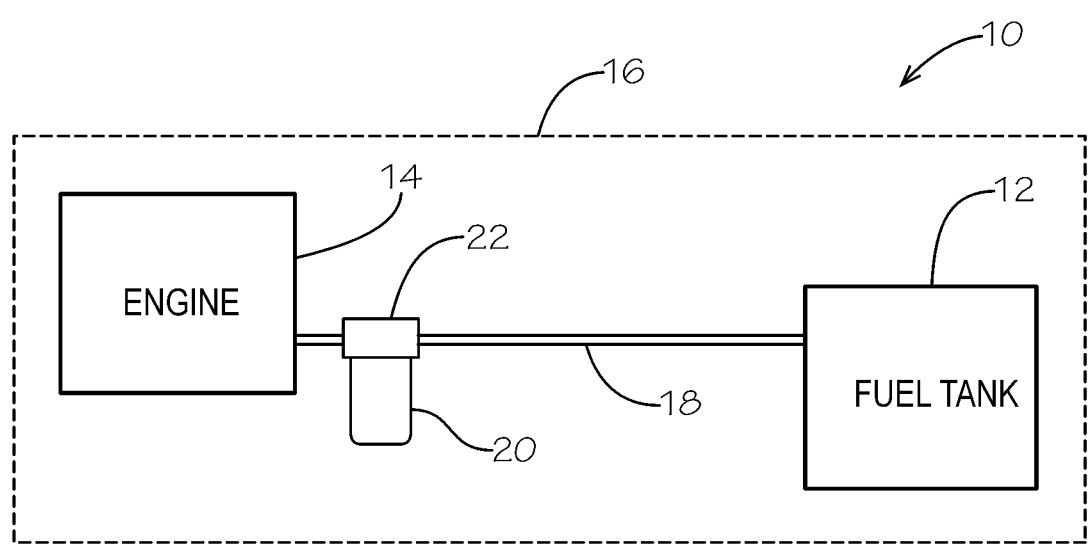
FIG. 1 illustrates a schematic view of an embodiment of a fuel heating apparatus in accordance with the present disclosure.

Referring now to the drawings, various views of embodiments of an arm positioner, or arm stabilizer device, and components therefor are illustrated. In the drawings, not all reference numbers are included in each drawing, for the sake of clarity. In addition, positional terms such as "upper," "lower," "side," "top," "bottom," "vertical," "horizontal" etc. refer to the apparatus when in the orientation shown in the drawings or similar orientations. A person of skill in the art will recognize that the apparatus can assume different orientations when in use.

An embodiment of a fuel heating apparatus 100 is shown in FIG. 1. The fuel heating apparatus 10 includes a fuel tank 12 and an engine 14. The fuel heating apparatus 10 may be positioned on a vehicle 16 in some embodiments. A fuel line 18 is positioned between the fuel tank 12 and the engine 14. Fuel line 18 provides a conduit for the flow of fuel from the fuel tank 12 to the engine 14. A fuel filter 20 is included on fuel line 18 to prevent debris or contaminants in the fuel from entering the engine 14. A fuel filter head 22 may be fixed on the vehicle 16, and the fuel filter 20 may be removably attached to the fuel filter head 22. Fuel filter 20 may be unscrewed from fuel filter head 22 and replaced at regular service intervals or when fuel filter 20 becomes clogged. Fuel filter 20 includes a screw-on canister-style fuel filter in some embodiments.

Figure 2:
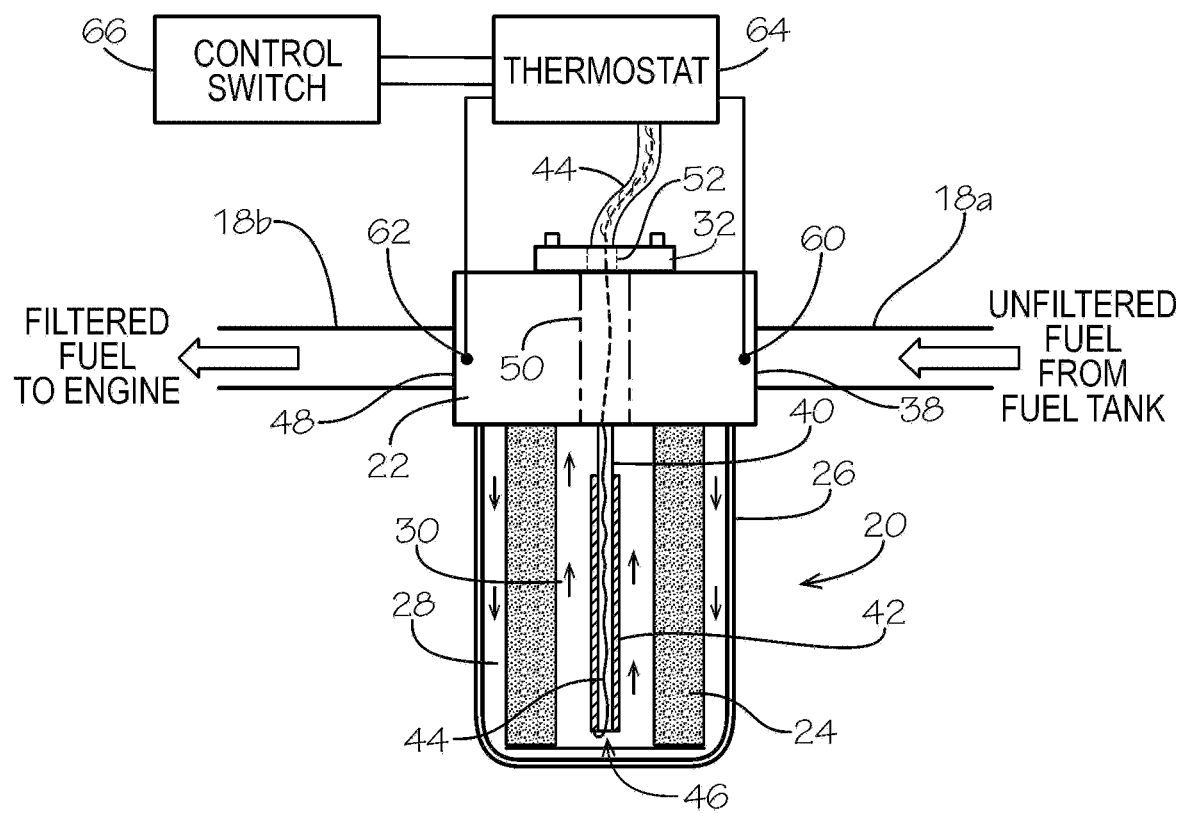
FIG. 2 illustrates a cross-sectional view of an embodiment of a fuel heating apparatus in accordance with the present disclosure.

The present disclosure provides a modified fuel filter assembly in some embodiments, as seen for example in FIG. 2. Fuel filter head 22 includes a fuel inlet 38 and a fuel outlet 48. A fuel filter 20 is installed on fuel filter head 22. Fuel filter 20 includes a filter housing 20 surrounding a fuel filter media 24 such as a fabric, paper or other porous filter material. Fuel travels into the fuel filter assembly from the incoming fuel line 18a, through fuel inlet 38, and into an unfiltered fuel plenum 28 on the radial exterior of the fuel filter media 24. The fuel then passes through the fuel filter media 24 and into a filtered fuel plenum 30 radially interior to the fuel filter media 24. The fuel then passes upwardly through the filtered fuel plenum 30 and out the fuel outlet 48 into the outgoing fuel line 18b toward the engine.

A support rod 40 extends downwardly from fuel filter head 22 in a position to be received inside the fuel filter 20 when the fuel filter 20 is installed on fuel filter head 22. In some embodiments, support rod 40 is housed inside the filtered fuel plenum 30 when fuel filter 20 is installed on fuel filter head 22. Support rod 40 includes a hollow interior passage 46 in some embodiments. A heating element 42 is disposed on support rod 40 such that heating element 42 is housed on the interior of fuel filter 20 in the filtered fuel plenum 30 during use. Heating element 42 includes any suitable device for generating heat on the interior of the fuel filter 20, and may include a resistance heating element. One or more heating element electrical leads 44 extend from heating element 42 for attachment to an electronic control such as a thermostat 64. In some embodiments, heating element lead 44 passes through hollow interior passage 46 on support rod 40 and out of the upper end of fuel filter head 22. Heating element lead 44 may then be connected to a thermostat 64.

A cover plate 32 is installed on the upper side of fuel filter head 32 in some embodiments. A central bore 50 is defined through the fuel filter head 22 from the upper side of the fuel filter head 22 downwardly through the fuel filter head 22. The central bore 50 allows passage of the support rod 40 together with the heating element 42 when fuel filter 20 is installed onto the fuel filter head 22. Cover plate 32 provides a cap blocking the opening of central bore 50 on the upper side of the fuel filter head 22. Cover plate 32 may be secured to the upper side of fuel filter head 32 using one or more cover plate fasteners 34, shown in FIG. 5.

A cover plate passage 52 is defined through the cover plate co-axially aligned with the central bore 50. Heating element lead 44 exits the cover plate 32 through the cover plate passage 52. An annular cover seal 54 is disposed between the cover plate 32 and the upper side of the fuel filter head 22 in some embodiments to prevent fuel from leaking from the interface between the cover plate 32 and the fuel filter head 22. An additional seal may be positioned around heating element lead 44 in cover plate passage 52 or the passage 46 in support rod 40 to prevent further leakage of fuel from the apparatus.

During use, a first temperature sensor 60 is positioned at the fuel inlet 38, and a second temperature sensor 62 is positioned at the fuel outlet 48 in some embodiments. The first and second temperature sensors each include a thermocouple in some embodiments. Each temperature sensor provides a temperature measurement to a thermostat 64 in some embodiments. The thermostat is operable to control the flow of electric current to the heating element 42 to regulate the temperature. A setpoint temperature may be selected on the thermostat, and the measured temperature from the first or second temperature sensor provides a reference temperature. A control switch 66 may be placed remote from the fuel filter 20, for example in the cab of a vehicle, to allow a user to control operation of the device, including the thermostat, and to turn the heating device on or off. For example, in some applications, the apparatus is operable to regulate the temperature inside the fuel filter at or above negative thirty degrees Fahrenheit to prevent gelling of the fuel inside the filter. In further applications, the apparatus is operable to regulate the temperature inside the fuel filter at or above zero degrees Fahrenheit to prevent gelling of the fuel inside the filter. In further embodiments, the apparatus is configured to automatically activate the heating element if the measured temperature inside the fuel filter drops below a setpoint, for example thirty-five degrees Fahrenheit. If the measured temperature drops below the setpoint, the heating element will begin heating the interior of the fuel filter until the measured temperature is back above the predetermined setpoint value.

Figure 3:
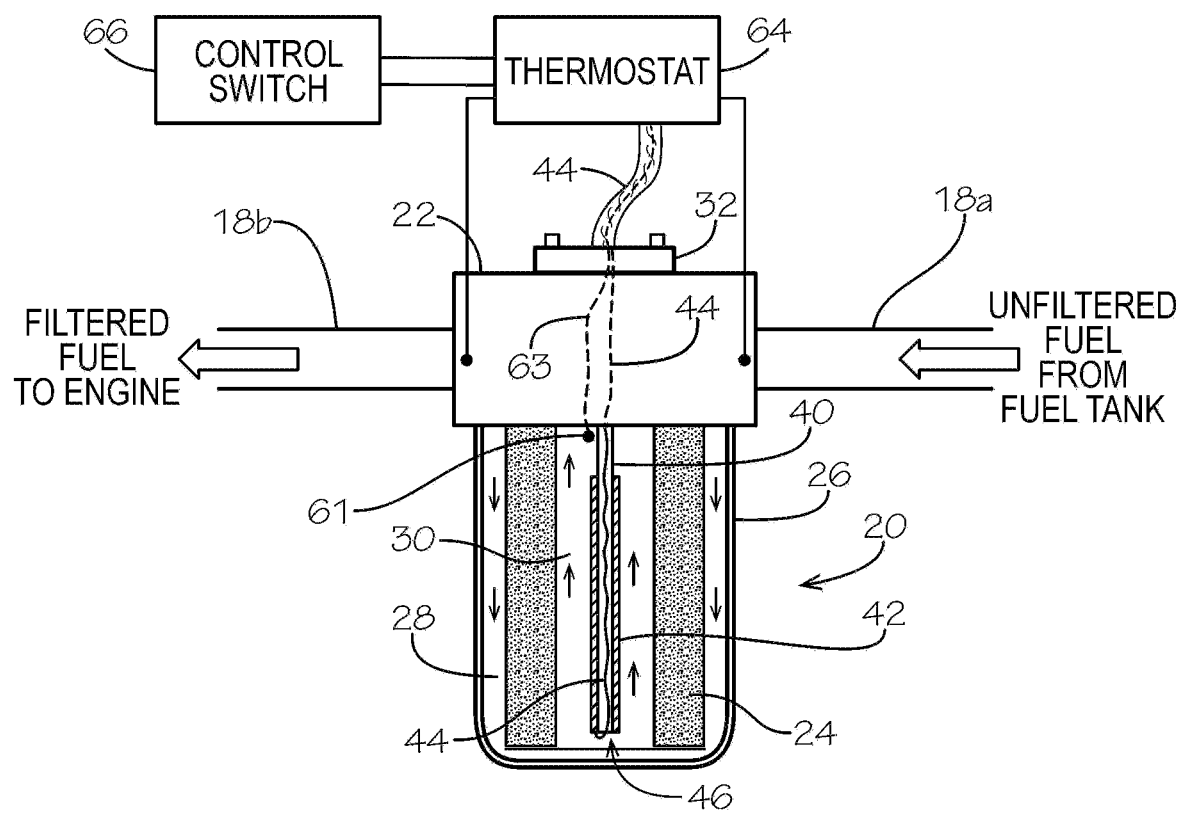
FIG. 3 illustrates a schematic view of an embodiment of a fuel heating apparatus in accordance with the present disclosure.

As seen in FIG. 3, in some embodiments, it is desirable for a user to know the measured temperature inside the fuel filter 20. In such embodiments, an interior temperature sensor 61 is positioned to be housed inside the fuel filter 20 when the fuel filter 20 is installed on the fuel filter head 22. Interior temperature sensor 61 includes a thermocouple in some embodiments. Interior temperature sensor 61 may be attached to the support rod 40, attached to the heating element 42, or generally positioned to reside on the interior of the fuel filter 20 extending downwardly from the fuel filter head 22, as shown in FIG. 3. An interior temperature sensor lead 63 provides a signal from the interior temperature sensor 61 to an electronic circuit outside the fuel filter 20. For example, interior temperature sensor lead 63 in some embodiments passes through the central bore in the fuel filter head 22 and out the cover plate 32 to a thermostat 64. The measured temperature inside the fuel filter 20 is provided to the thermostat 64 via the interior temperature sensor lead 63. The measured temperature inside fuel filter 20 may be used to control operation of heating element 42. For example, when the measured temperature from interior temperature sensor 63 is below a setpoint temperature, the thermostat 62 is operable to send current to heating element 42 until the measured interior temperature is equal to or within an acceptable range of the setpoint temperature.

Figure 4:
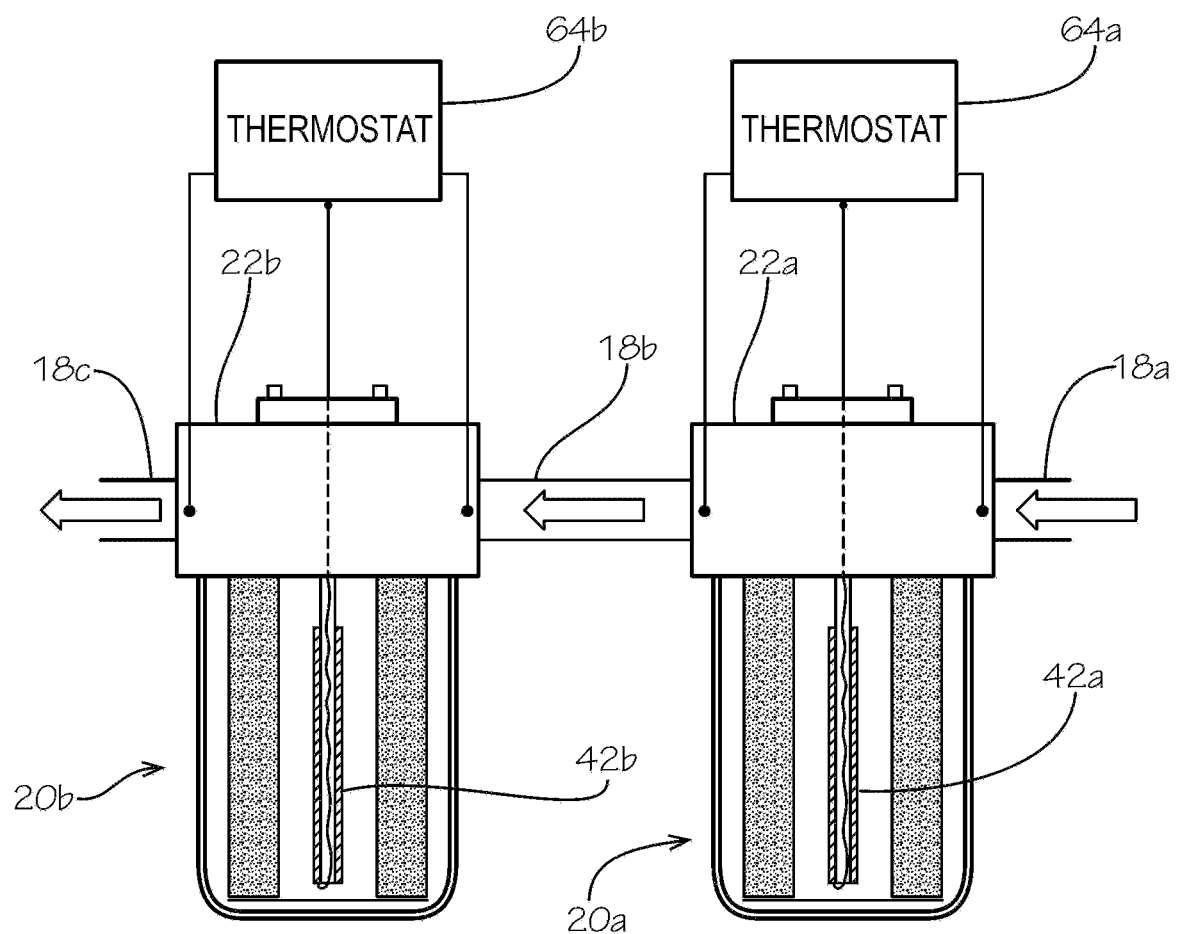
FIG. 4 illustrates a schematic view of an embodiment of a fuel heating apparatus in accordance with the present disclosure.

The fuel heating apparatus of the present disclosure may be used in combination with multiple fuel filters along a fuel line in series or in parallel. For example, as seen in FIG. 4, a fuel line includes an incoming fuel line 18*a* supplying fuel to a first fuel filter head 22*a*. A first fuel filter 20*a* is installed on first fuel filter head 22*a*. A first heating element 42*a* is disposed on the interior of first fuel filter 20*a*, and a second heating element 42*b* is disposed on the interior of second fuel filter 20*b*. First heating element 42*a* is connected to a first thermostat 64*a*, and second heating element 42*b* is connected to a second thermostat 64*b*. First and second thermostats 64*a*, 64*b* may be controlled together or separately to achieve desired heating inside each fuel filter 20*a*, 20*b*.

Figure 5:
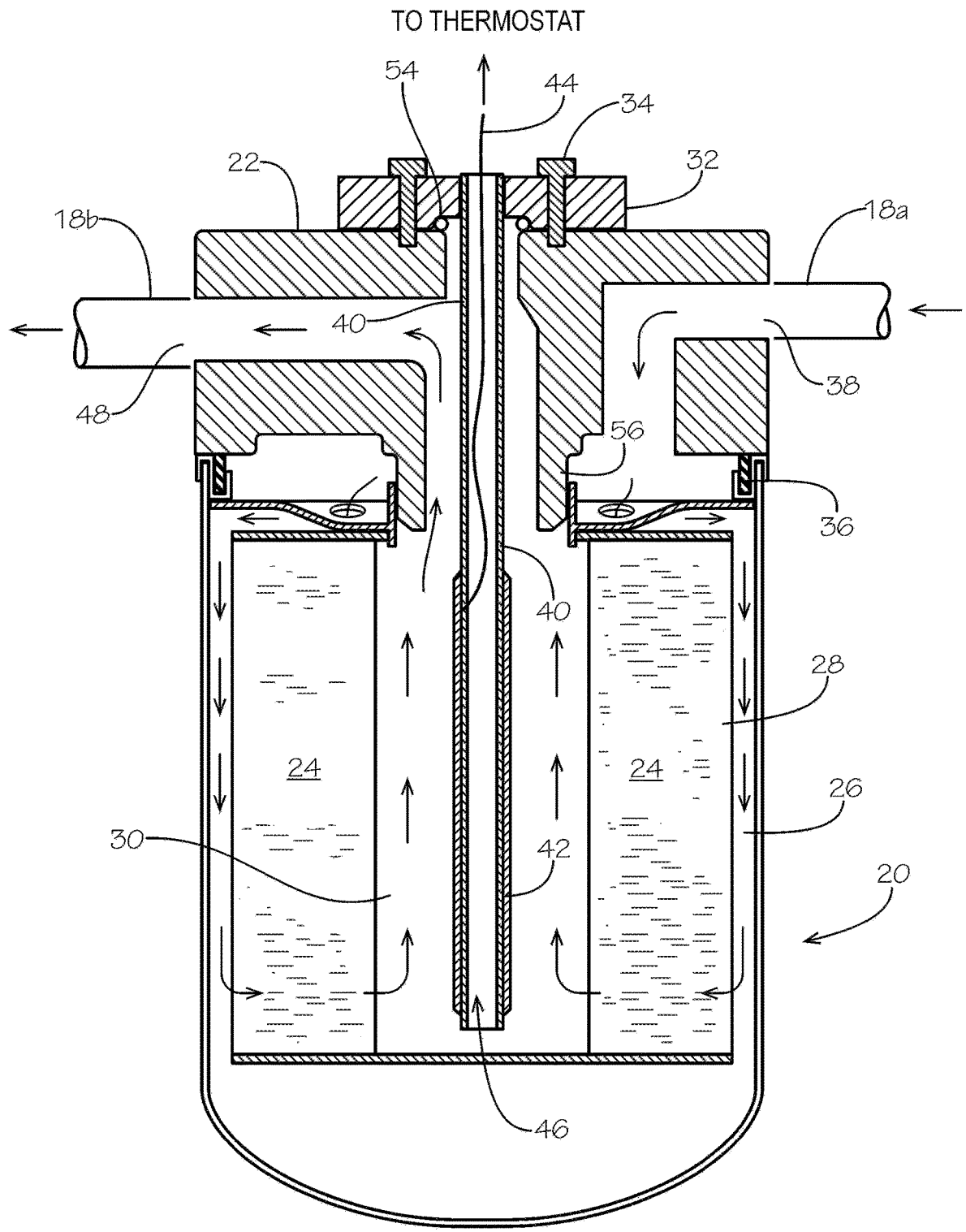
FIG. 5 illustrates a schematic view of an embodiment of a fuel heating apparatus in accordance with the present disclosure.

Referring to FIG. 5, an embodiment of a fuel heating apparatus includes a fuel filter head 22 and a fuel filter 20 attached to the fuel filter head. A threaded filter mount 56 is disposed on the fuel filter head 22, and fuel filter 20 includes a threaded filter socket that screws onto the threaded filter mount 56 in some embodiments. An annular filter seal 36 is positioned around the upper rim of the fuel filter between the fuel filter housing 26 and the fuel filter head 22. Fuel flows from the incoming fuel line 18*a* into the fuel inlet 38 and passes through a channel in the fuel filter head 22 into the intake on the fuel filter 20. Fuel passes into the fuel filter 20 and enters an unfiltered plenum 28 between filter housing 26 and filter media 24. Fuel then travels through filter media 24 into a filtered fuel plenum 30 on the interior of the fuel filter 20. Filtered fuel travels upwardly through a channel in the fuel filter head and out the fuel outlet 48 on fuel filter head 22.

Heating element 42 is positioned inside filtered fuel plenum 30 to provide heat to the interior of fuel filter 20 to prevent gelling of the fuel inside the fuel filter during transport or during idle, or at rest. A heating element lead 44 passes through the interior passage 46 in support rod 40 in some embodiments. Heating element lead 44 passes out of the fuel filter head through a cover plate passage in cover plate 32 and is connected to an electronic circuit to regulate the temperature inside the fuel filter 20.

Figure 6:
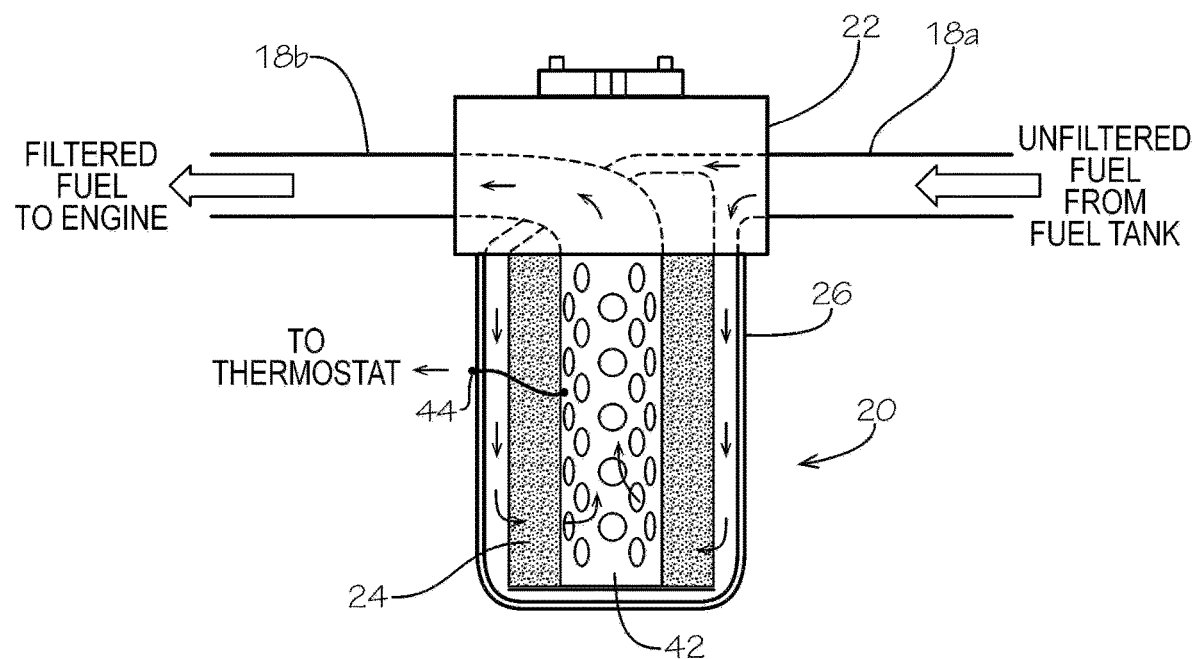
FIG. 6 illustrates a schematic view of an embodiment of a fuel heating apparatus in accordance with the present disclosure.

In some embodiments, it is desirable to provide a fuel heating apparatus having a heating device for use with a conventional fuel filter head. Referring to FIG. 6, in some embodiments the present disclosure provides a modified fuel filter 20 having a fuel filter housing 26 surrounding a fuel filter medium 24 and an inner metal screen forming a heating element 42. Metal screen heating element 42 provides a porous structure supporting fuel filter medium 24 and defining a filtered fuel plenum on the interior of the metal screen heating element 42. Metal screen heating element 42 includes one or more holes to allow passage of filtered fuel into the filtered fuel plenum. In some embodiments, the metal screen heating element 42 forms a resistance heating element operable to heat the interior of fuel filter 20 when current is passed through the metal screen heating element 42. Metal screen heating element 42 includes a heating element lead 44 extending through the fuel filter to an exterior electrical terminal. A connector wire may be attached to the exterior electrical terminal on the exterior of fuel filter housing 26 to connect the heating element lead 44 to a thermostat for controlling the operation of the metal screen heating element 42. One or more temperature sensors, such as a thermocouple, may be positioned inside the fuel filter and connected to an exterior terminal to provide measurement of the temperature inside the fuel filter for controlling the thermostat.

Figure 7:
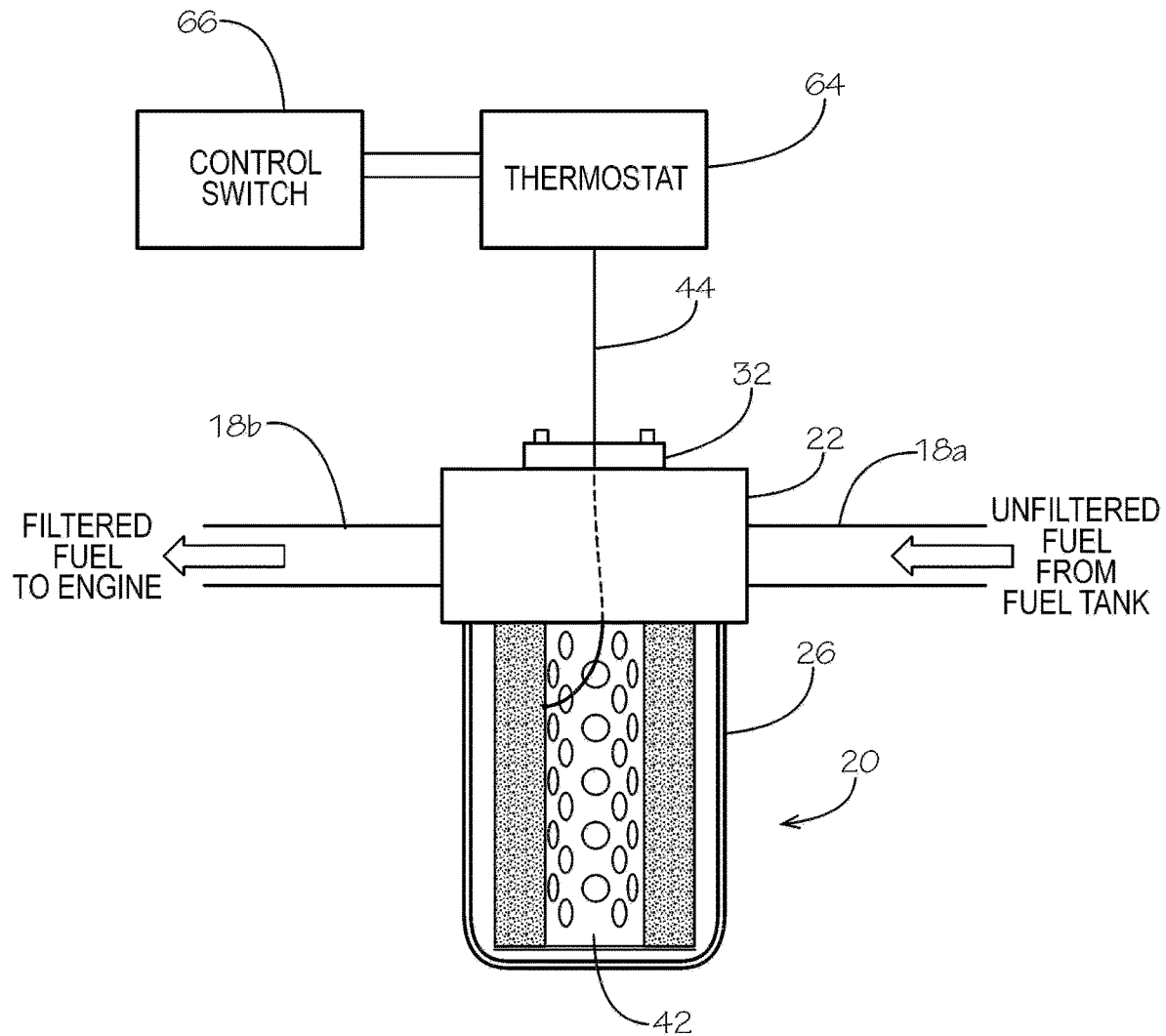
FIG. 7 illustrates a schematic view of an embodiment of a fuel heating apparatus in accordance with the present disclosure.

As seen in FIG. 7 in an alternative embodiment, metal screen heating element 42 includes a heating element lead 44 passing through the central bore in the fuel filter head 22 to a thermostat 64.

In further embodiments, the present disclosure provides an apparatus to not only prevent gelling of fuel, but to also improve fuel efficiency by pre-heating fuel prior to delivery of the fuel to the engine for combustion. It has been observed through experiments that fuel entering the combustion chamber of an engine in conventional fuel delivery systems varies widely depending on numerous variables. By pre-heating the fuel prior to delivery to the engine, gains in fuel efficiency may be achieved. For example, in certain experiments, it was observed that an increase of approximately forty degrees in fuel temperature to between 75 degrees F. and 115 degrees F. resulted in an increase in fuel efficiency from 5.0 miles per gallon to 6.2 miles per gallon, which when normalized for variation in air density constitutes about a fifteen percent increase in miles per gallon efficiency. Additional experimental results further corroborate these findings.

Figure 8:
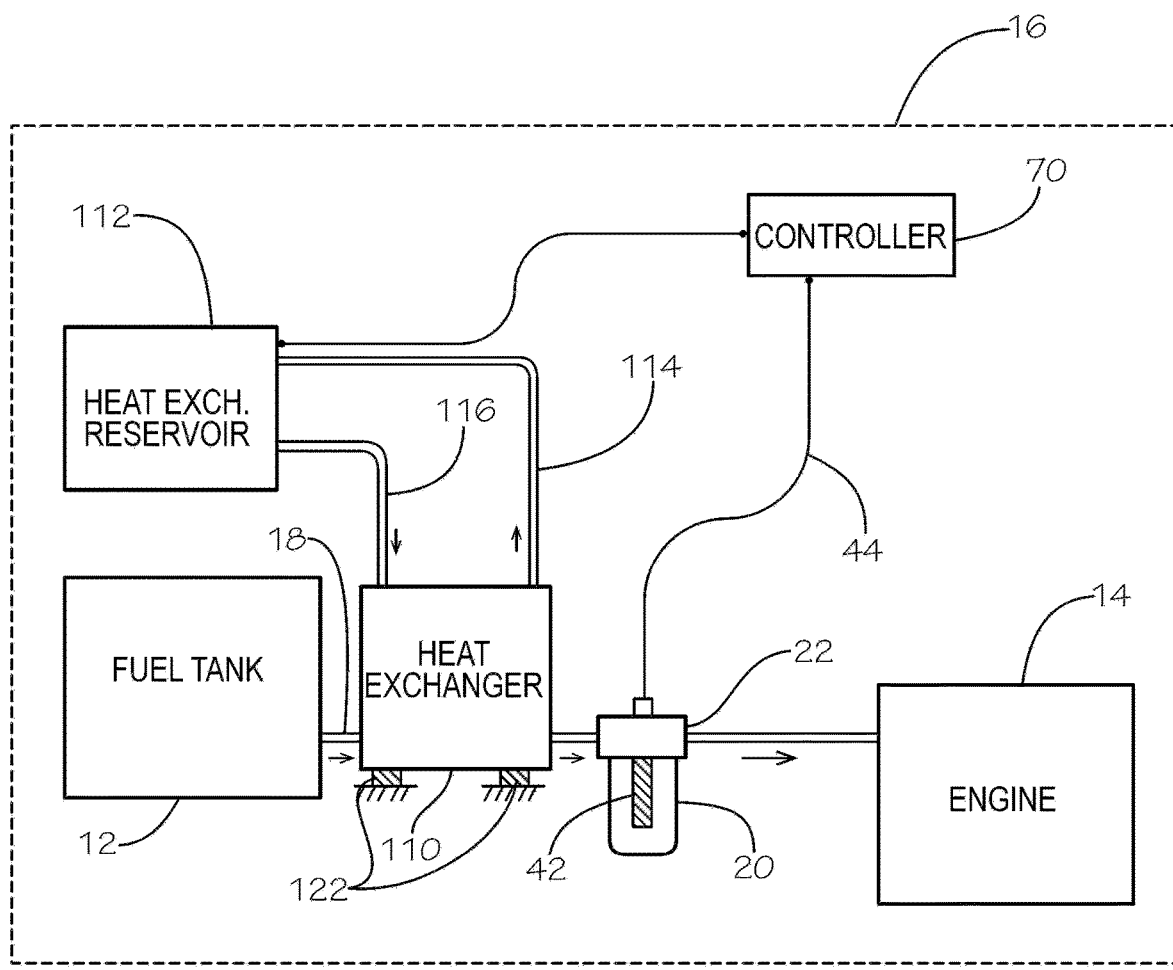
FIG. 8 illustrates a schematic view of an embodiment of a fuel heating apparatus in accordance with the present disclosure.

The present disclosure provides a fuel heating system including a controlled fuel temperature apparatus and associated methods to regulate the temperature of fuel delivered to the engine for combustion. As shown in FIG. 8, an embodiment of the controlled fuel temperature apparatus includes a fuel tank 12, an engine 14, and a fuel line 18 disposed between the fuel tank and the engine. A fuel temperature regulator is positioned between the fuel tank and the engine to control the fuel temperature en route to the engine for combustion. The fuel temperature regulator includes a working thermal fluid passed through a heat exchanger 110 in thermal contact with the fuel. The fuel being delivered to the engine passes through a heat exchanger 110 through which a working thermal fluid also passes. The working thermal fluid enters the heat exchanger through a heat exchanger inlet 116 and exits the heat exchanger through a heat exchanger outlet 114. The working thermal fluid is contained in a remote heat exchanger reservoir 112.

Thermal energy is transferred between the working thermal fluid and the fuel upstream of the engine to regulate the temperature of the fuel in a desired range or at a desired setpoint value. The temperature-regulated fuel exits the heat exchanger 110 of the fuel temperature regulator and continues downstream toward the engine. The temperature-regulated fuel may travel through a downstream fuel filter 20 in some embodiments. Fuel filter 20 includes a heating element 42 in some embodiments to further prevent gelling of fuel during startup, during idle, or during non-use in cold environments. A controller 70 is coupled to the controlled temperature regulator to control the flow and temperature of working thermal fluid in the heat exchanger 110. Controller 70 in some embodiments is connected to a pump or a flow controller along heat exchanger inlet 116 or heat exchanger outlet 114 to regulate the flow rate and/or temperature of the working thermal fluid passing through the heat exchanger fluid circuit.

As seen in FIG. 8, in some embodiments, heat exchanger 110 includes a conventional flow-type heat exchanger including a fluid circuit for passage of the working thermal fluid and a separate fluid circuit for passage of the fuel to be heated. The working thermal fluid and the fuel to be heated do not come into direct contact in the heat exchanger, but instead are in thermal contact via the heat exchanger structure. One or more vibration isolation mounts 122 are installed between the heat exchanger 110 and the vehicle to reduce the effects of vibration on the complex heat exchanger geometry during extended use.

Figure 9:
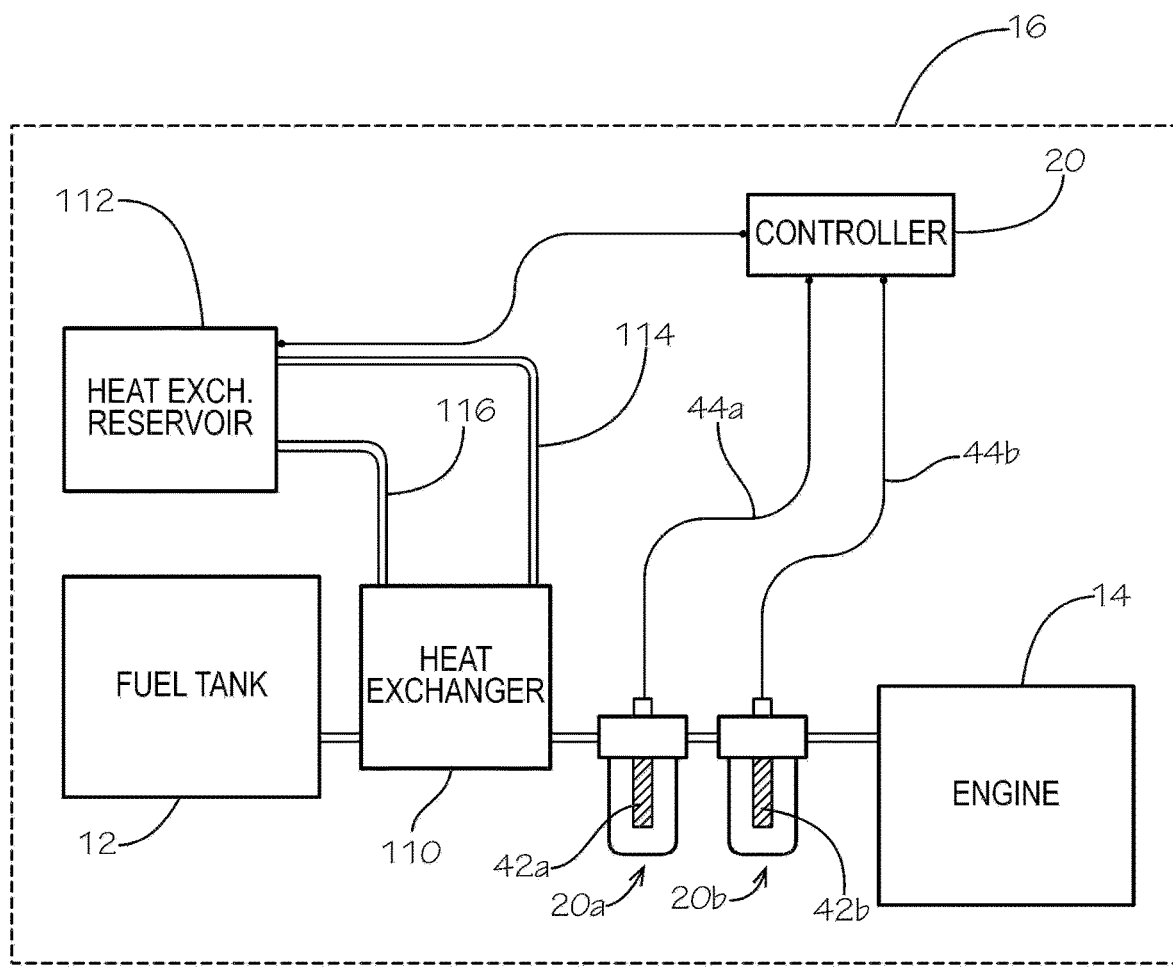
FIG. 9 illustrates a schematic view of an embodiment of a fuel heating apparatus in accordance with the present disclosure.

As seen in FIG. 8 and FIG. 9, in further embodiments, the present disclosure provides a fuel heating apparatus including a fuel filter heater and a controlled fuel temperature module. The apparatus includes a combined unit including a fuel filter head 22 having a heating element 42 extending from the fuel filter head positioned to reside on the interior of a fuel filter 20 in the filtered fuel plenum. The combined unit of the apparatus also includes a heat exchanger 110 through which the fuel is passed during flow of fuel through the fuel line 18. A working thermal fluid is also passed through the heat exchanger 110 such that the temperature of the fuel travelling through the fuel line is regulated by the heat exchanger 110. The heating element inside the fuel filter 20 also prevents gelling of the fuel.

As shown in FIG. 9, the combined controlled fuel temperature module includes first and second fuel filters 20a, 20b each including its own heating element 42a, 42b positioned downstream of a heat exchanger 110 which pre-heats the fuel prior to delivery into the first and second fuel filters 20a, 20b. The heated fuel passes through the first and second fuel filters 20a, 20b and enters the engine for combustion. In some embodiments, first and second heating elements 42a, 42b are independently controlled by controller 20 via first heating element lead 44a and second heating element lead 44b.

In some embodiments, the fuel temperature regulator, or controlled fuel temperature module, is installed on a vehicle at a location accessible by a user. One or more bypass lines may be disposed on the module to allow a user to selectively engage or disengage the fuel temperature regulator. Additionally, a bypass valve and a bypass line are installed on the heat exchanger in some embodiments to selectively block the flow of the working thermal fluid through the heat exchanger at a user's discretion.

Figure 10:
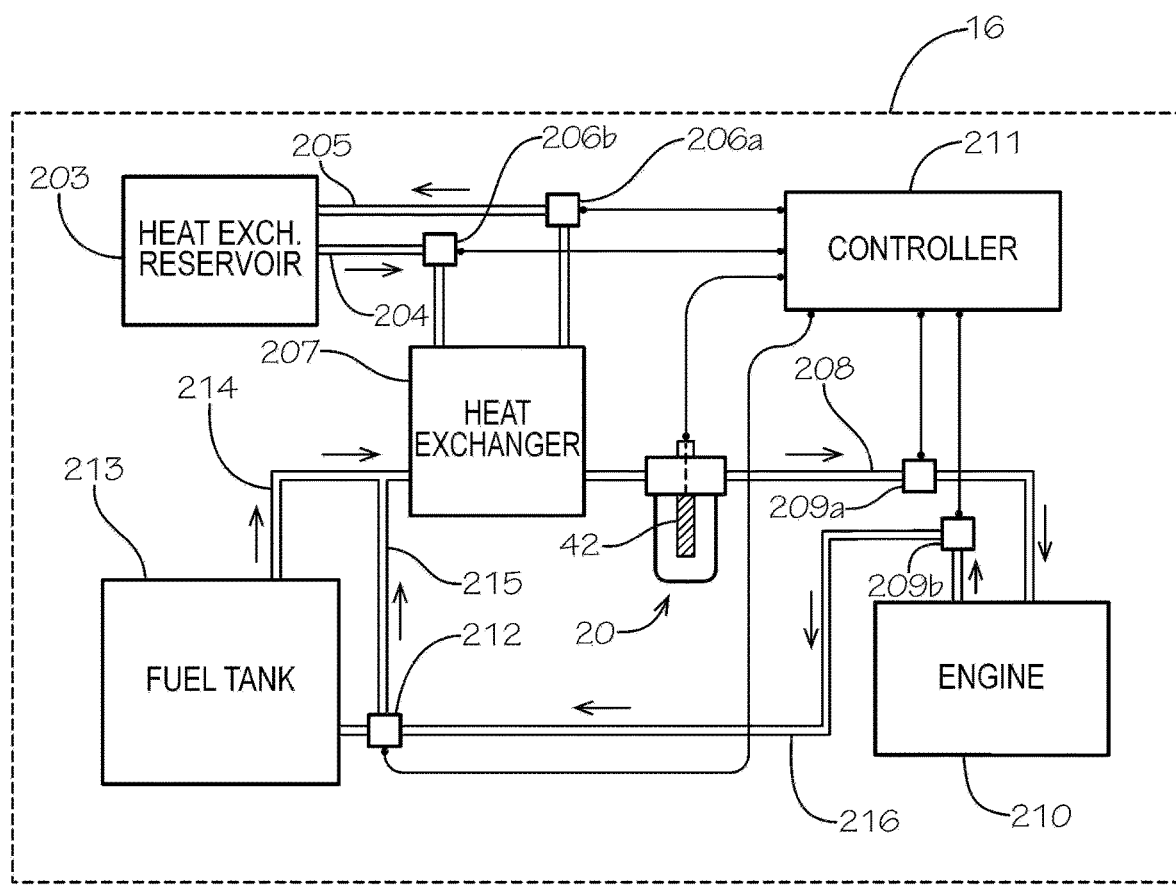
FIG. 10 illustrates a schematic view of an embodiment of a fuel heating apparatus in accordance with the present disclosure.

As shown in an example in FIG. 10, a fuel heating apparatus includes a fuel temperature regulator including a fuel tank 213 and a fuel line 214 exiting the fuel tank. The fuel from the fuel tank enters a heat exchanger 207. The heat exchanger 207 includes a fluid circuit containing a working thermal fluid to provide heat to the fuel. The working thermal fluid enters the heat exchanger 207 via the heat exchanger supply 204, or hot supply. The working thermal fluid exits the heat exchanger and returns to a thermal fluid reservoir 203 via a heat exchanger return line 205. Heat exchanger reservoir 203 may include any thermal fluid source in a vehicle, such as engine coolant, exhaust gas, heated liquid oil from the engine, or heated fluid from the transmission. The working thermal fluid may be directly or indirectly heated from any of the above-listed heat sources. In some embodiments, a separate heat source such as a resistance heating element is provided in heat exchanger reservoir 203 to provide desired heat to the working thermal fluid.

A first flow controller 206a is positioned on the heat exchanger return line 205, and a second flow controller 206b is positioned on the heat exchanger supply line 204 in some embodiments. Each flow controller 206a, 206b is electrically connected to a controller 211. Controller 211 is operable to control the flow of working thermal fluid to and/or from the heat exchanger 207 to provide desired heat transfer to the fuel passing through the heat exchanger 207.

In some embodiments, a first temperature sensor 209a is positioned downstream of the heat exchanger 110 on the heated fuel supply line 208. The first temperature sensor 209a includes a thermocouple in some embodiments. The first temperature sensor 209a is connected to controller 211 to provide a measured fuel temperature downstream of heat exchanger 207. If the measured fuel temperature at first temperature sensor 209a is not within a desired range or at a desired setpoint temperature, the controller may command the first and/or second flow controller 206a, 206b to adjust the flow between heat exchanger reservoir 203 and heat exchanger 207.

As shown in FIG. 10, the apparatus also includes a fuel return line 216 extending between the engine 201 and fuel tank 213. This type of fuel return line 216 is common in diesel engines. A bypass valve 212 is positioned on the fuel return line 216 upstream of the fuel tank 213. Bypass valve 212 is connected to controller 211. Upon a user's instruction or a programmed algorithm, controller 211 may operate bypass valve 212 to selectively re-direct fuel travelling through return fuel line 216 along bypass line 215 around fuel tank 213 and back into fuel supply line 214 upstream of heat exchanger 207. This bypass is desirable during the initial startup and initial operation of a vehicle from a cold start. The fuel travelling through the return fuel line 216 is generally closer to the engine temperature than the fuel tank temperature. Thus, by bypassing the fuel tank using bypass valve 212, incoming fuel delivered to the heat exchanger may be pre-heated via passage through the engine and engine return line 216 prior to entry into the heat exchanger 207.

A second temperature sensor 209b is disposed on the fuel return line 216 downstream of the engine 210. Second temperature sensor 209b is connected to the controller so that the temperature of fuel in the fuel return line 216 downstream of the engine may be measured. Depending on the measured temperature in the fuel return line 216 downstream of the engine, a user or a programmed algorithm in the controller may selectively choose to operate bypass valve 212 to an open or closed position.

Referring further to FIG. 10, a fuel filter 20 is positioned between the heat exchanger 207 and the engine 210. Fuel filter 20 includes a heating element 42 to heat the interior of fuel filter 20 to prevent gelling. Heating element 42 is connected to controller 211. One or more temperature sensors are disposed in heating filter 20 to provide temperature measurement to controller 211 in some embodiments. Controller 211 operable to monitor the temperature inside fuel filter 20 and to adjust the current supplied to heating element 42 to maintain a desired temperature inside fuel filter 20 during use, during idle, or during periods of rest of vehicle 16.

Figure 11:
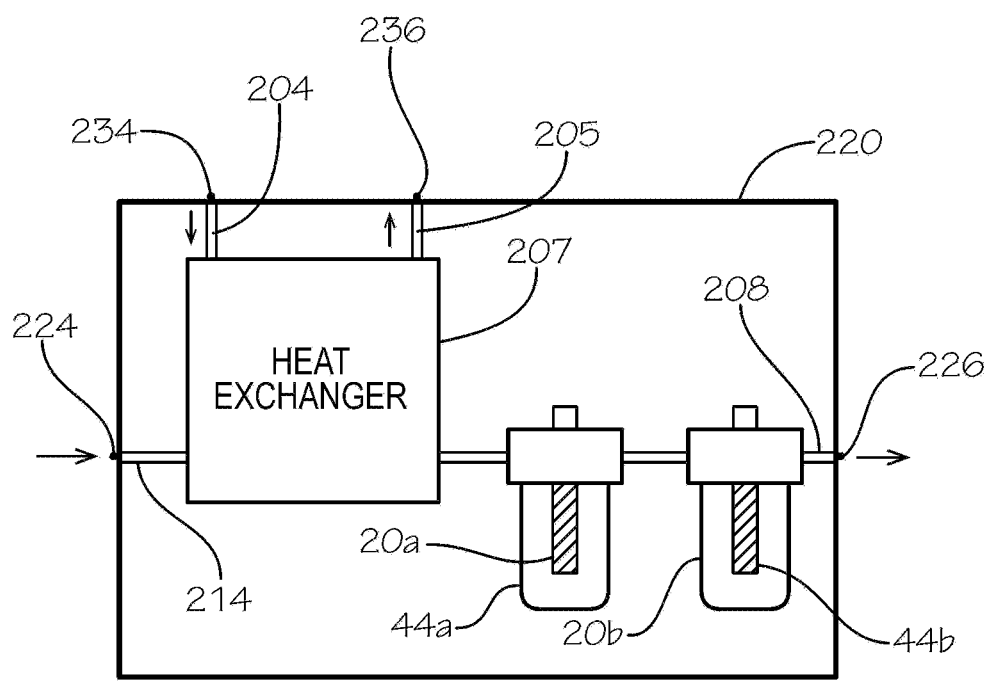
FIG. 11 illustrates a schematic view of an embodiment of a fuel heating apparatus in accordance with the present disclosure.

Referring now to FIG. 11, in some embodiments fuel heating apparatus 220 includes a module that may be installed as a discrete unit along a fuel line in a vehicle. Fuel heating apparatus 220 includes a heat exchanger 207, a heat exchanger supply 204 and a heat exchanger return 205. A heat exchanger supply coupling 236 is connectable to a hose or other supply line fitting for supplying a working thermal fluid to heat exchanger 207. Similarly, a heat exchanger return coupling 234 is connectable to a hose or other return line fitting for returning a working thermal fluid to a heat exchanger fluid source or heat exchanger reservoir (such as a radiator, oil reservoir, thermal bath, etc.). A first fuel line connector 224 is connectable to a fuel line for passing fuel into supply fuel line 214 upstream of heat exchanger 207. A second fuel line connector 226 is positioned downstream of heat exchanger 207 for connecting heated fuel line 208 to a fuel line segment to deliver fuel to an engine. One or more fuel filters 20a, 20b are positioned between heat exchanger 207 and second fuel line connector 226 on the module. First fuel filter 20a includes a first heating element 44a, and second fuel filter 20b includes a second heating element 44b. Each heating element include one or more leads for connecting the heating element to an electrical circuit for controlling the operation of the heating element. Additionally, one or more temperature sensors are located in each fuel filter to provide measurement of the temperature in each fuel filter to remote controller. Notably, in some applications, the increase of temperature of fuel passing through the heat exchanger may be limited by the temperature of the working thermal fluid and the heat exchanger efficiency. For example, if the working thermal fluid passing through the heat exchanger is engine coolant, the incoming working thermal fluid temperature would be substantially equal to the engine coolant temperature, or about 190 to 210 degrees F. in some applications. This means the upper limit of the heated fuel temperature would be in a similar range, if not slightly lower due to thermal losses in the heat exchanger in such embodiments. Similarly, if the incoming working thermal fluid is from the engine oil reservoir, then the upper limit on the heated fuel temperature would be in the same range as the engine oil reservoir temperature or slightly lower due to thermal losses in the system. Additionally, in some embodiments, the heating elements in first and second fuel filters may also provide additional heat to the fuel passing through the fuel line, and may be operable to increase fuel temperature by about an additional five to fifteen degrees F. in some applications.

Figure 12:
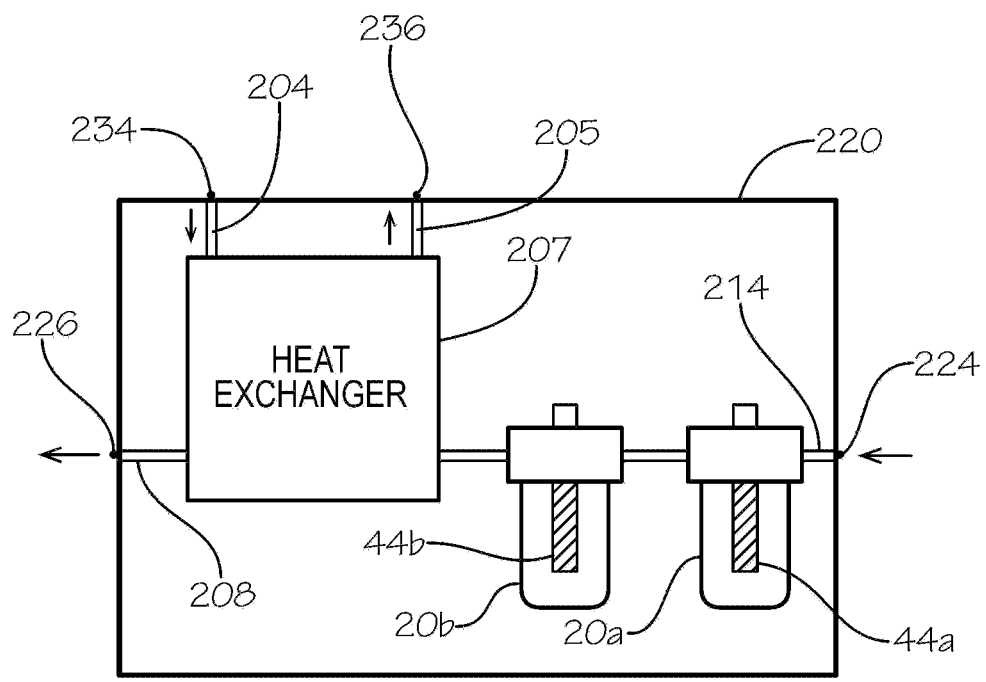
FIG. 12 illustrates a schematic view of an embodiment of a fuel heating apparatus in accordance with the present disclosure.

Referring to FIG. 12, in some embodiments, the flow direction of fuel travelling through module 220 may be reversed such that the fuel enters the fuel filters 20a, 20b upstream of heat exchanger 207.

Figure 13:
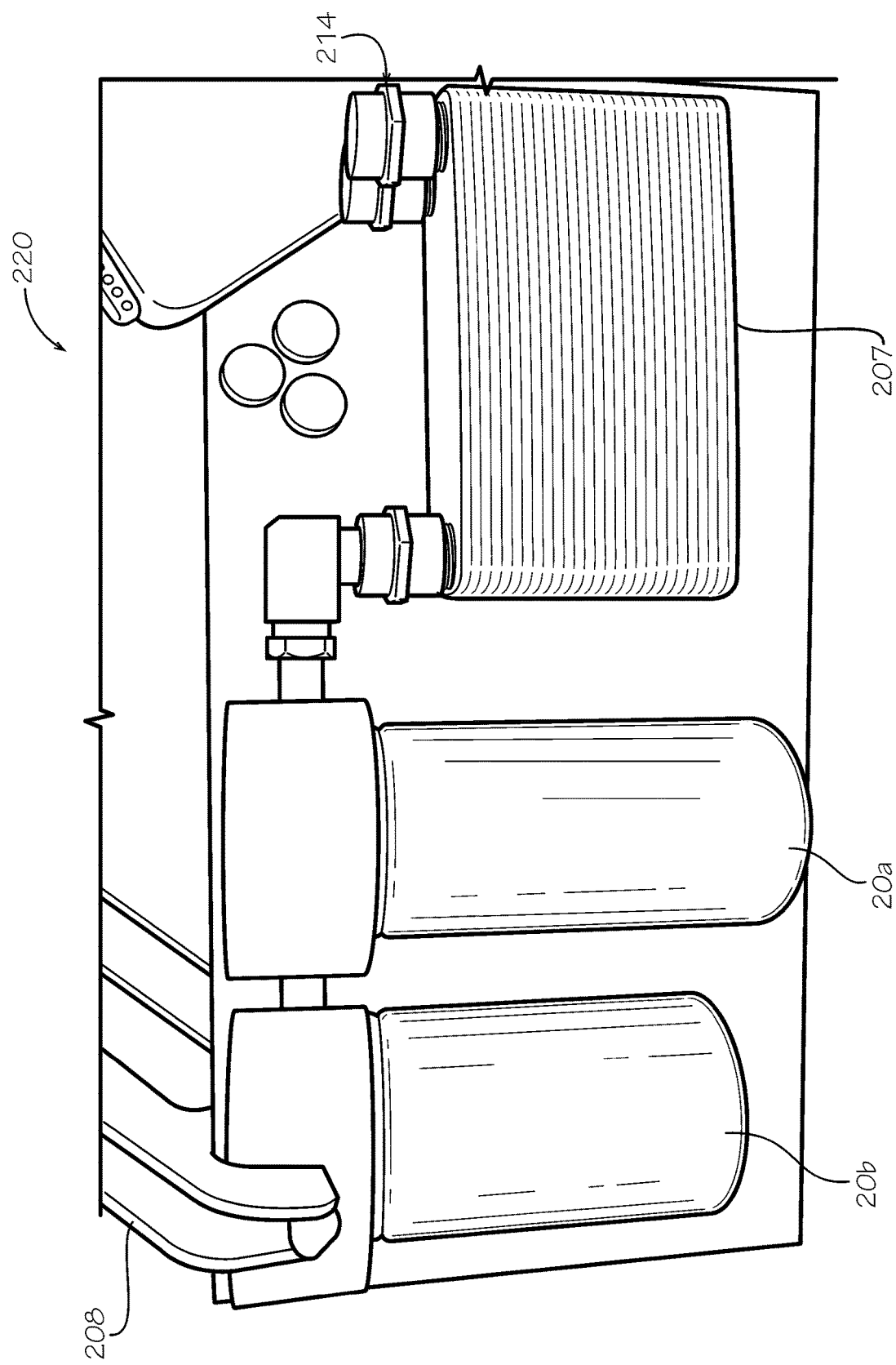
FIG. 13 illustrates a schematic view of an embodiment of a fuel heating apparatus in accordance with the present disclosure.

Referring to FIG. 13, an embodiment of a fuel heating apparatus 220 includes a heat exchanger 207, a first fuel filter 20a downstream of the heat exchanger 207, and a second fuel filter 20b in series with the first fuel filter 20a and heat exchanger 207 downstream of the heat exchanger 207. A heated fuel supply line 208 exits the second fuel filter 20b and sends heated, filtered fuel to the engine for combustion. An unheated fuel supply line 214 enters the heat exchanger 207. A working thermal fluid at a desired temperature passes through heat exchanger 207 to heat the fuel travelling through heat exchanger 207.

Figure 14:
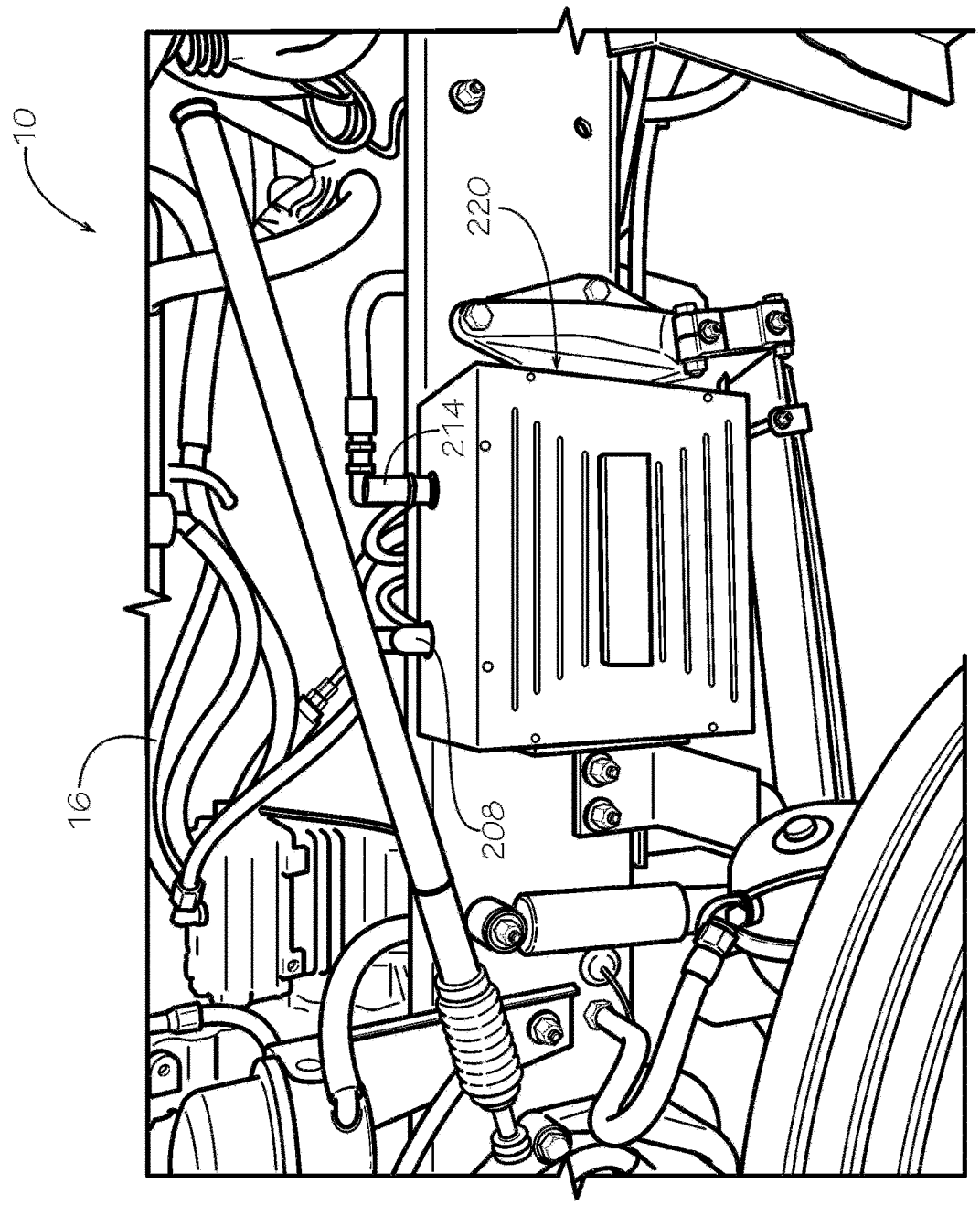
FIG. 14 illustrates a perspective view of an embodiment of a fuel heating apparatus in accordance with the present disclosure.

As seen in FIG. 14, fuel heating apparatus 220 may be positioned inside a housing or box mounted at a convenient location on a vehicle 16. The apparatus 220 is self-contained inside a housing having an unheated fuel supply line 214 entering the housing, and a heated fuel supply line exiting the housing. One or more tube fittings are positioned on the box to allow modular interconnection with the existing fuel line. Similarly, a heat exchanger input fitting is disposed on the apparatus 220, and a heat exchanger output fitting is also disposed on the apparatus 220 to allow ease of connection with a heat exchanger working thermal fluid supply and return tubing. Placement of the housing at a convenient location such as on the frame allows a user to access the fuel filters and heat exchanger, as well as control modules and valves inside the housing with ease. In comparison to conventional oil filter placements on a vehicle which are very difficult to access, the combined unit with a modular arrangement in the housing provides enhanced operability and maintenance. Additionally, placement of the fuel filters inside a housing protects the filters from being hit or punctured by debris during use.

In further embodiments, the present disclosure provides an apparatus and method for reducing pollutant emissions. By heating the fuel prior to delivery to the engine for combustion, experimental results confirm a fuel efficiency increase in a range from 1% to 15%. Further increases in fuel efficiency may be achieved by optimization of the system, up to about 50% improvement in fuel efficiency. When less fuel is burned, fewer emissions per unit time and per mile are released into the atmosphere. It has also been observed that by pre-heating the fuel prior to combustion using a heat exchanger as described herein, the visible pollutants and particulates released from a diesel engine exhaust are reduced. As such, the present disclosure provides devices and methods for improving fuel efficiency and also for reducing emissions of harmful pollutants during combustion.

In a further embodiment, the present disclosure provides a method of improving the fuel efficiency of an internal combustion engine by passing a working thermal fluid such as engine coolant, engine oil, transmission fluid, or another thermal fluid source through a heat exchanger simultaneously with fuel upstream of the engine to recapture heat from the working thermal fluid and to transfer the heat to the fuel for pre-heating the fuel prior to delivery to the engine for combustion. This feature allows pre-heating of the fuel without incurring additional losses associated with heat generation, as the thermal energy of the already-heated working thermal fluid may be transferred at no cost to the fuel.

Thus, although there have been described particular embodiments of the present invention of a new and useful FUEL HEATING APPARATUS AND METHODS, it is not intended that such references be construed as limitations upon the scope of this invention except as set forth in the following claims.

What is claimed is:

1. A method of improving fuel efficiency in vehicle, comprising the steps of:
providing a combustion system including a fuel tank, an engine, and a fuel line disposed between the fuel tank and the engine;
providing a heat exchanger on the fuel line between the fuel tank and the engine, wherein the heat exchanger includes a heat exchanger supply coupling, a heat exchanger return coupling, a first fuel line connector, and a second fuel line connector;
providing a heat exchanger reservoir on the vehicle, wherein the fuel line includes a fuel supply line upstream of the heat exchanger and a heated fuel line downstream of the heat exchanger;
connecting the first fuel line connector to the fuel supply line on the fuel line upstream of the heat exchanger;

passing fuel from the fuel supply line to the heat exchanger via the first fuel line connector;

connecting the second fuel line connector to the heated fuel line on the fuel line downstream of the heat exchanger;

passing fuel out of the heat exchanger to the heated fuel line via the second fuel line connector;

simultaneously passing working thermal fluid from the heat exchanger reservoir into the heat exchanger at a first flow rate via the heat exchanger supply coupling, through the heat exchanger, and returning the working thermal fluid from the heat exchanger to the heat exchanger reservoir via the heat exchanger return coupling such that the working thermal fluid transfers heat to the fuel inside the heat exchanger prior to delivery of the fuel to the engine for combustion, wherein the working thermal fluid does not contact the fuel inside the heat exchanger;

increasing the temperature of the fuel passing through the heat exchanger, wherein the fuel is heated in the heat exchanger;

monitoring the temperature of the heated fuel using a temperature sensor, wherein the temperature sensor includes a thermocouple attached to a support rod;

updating, via a flow controller, the simultaneous passage of working thermal fluid from the heat exchange reservoir into the heat exchanger to occur at a second flow rate different than the first flow rate based on the monitored temperature of the heated fuel;

providing a first vibration isolation mount installed between the heat exchanger and the vehicle;

reducing vibration of the heat exchanger via the first vibration isolation mount;

delivering the heated fuel from the heat exchanger to the engine; and improving the fuel efficiency of the engine by burning the heated fuel.

2. The method of claim 1, wherein the working thermal fluid is heated engine coolant from the engine.

3. The method of claim 2, wherein the fuel is heated in the heat exchanger to a temperature between about 180 degrees F. and about 210 degrees F.

4. The method of claim 2, wherein the method further comprises reducing exhaust pollutants from the internal combustion engine.

5. The method of claim 4, wherein the method further comprises:
providing a fuel filter, wherein the support rod is disposed in the fuel filter; and
heating the fuel inside the fuel filter as the fuel passes through the fuel filter.

6. The method of claim 4, further comprising providing a second vibration isolation mount installed between the heat exchanger and the vehicle.

7. The method of claim 6, further comprising reducing vibration of the heat exchanger via the second vibration isolation mount.

8. A vehicle apparatus, comprising:
a vehicle;
an engine disposed on the vehicle;
a fuel tank disposed on the vehicle;
a fuel line disposed on the vehicle between the engine and the fuel tank;
a heat exchanger reservoir disposed on the vehicle;
a heat exchanger disposed on the vehicle between the fuel tank and the engine, the heat exchanger including a heat exchanger supply coupling, a heat exchanger return coupling, a first fuel line connector, and a second fuel line connector;
a temperature sensor disposed downstream of the heat exchanger, wherein the temperature sensor includes a thermocouple attached to a support rod;
a flow controller disposed upstream of the heat exchanger;
a vibration isolation mount positioned between the heat exchanger and the vehicle; and
the fuel line including a fuel supply line upstream of the heat exchanger and a heated fuel line downstream of the heat exchanger;
wherein the heat exchanger supply coupling is connected to the heat exchanger reservoir and is configured to supply a flow of working thermal fluid to the heat exchanger from the heat exchanger reservoir,
wherein the heat exchanger return coupling is connected to the heat exchanger reservoir and is configured to return working thermal fluid to the heat exchanger reservoir from the heat exchanger,
wherein the temperature sensor is configured to monitor a temperature of the heated fuel line,
wherein the flow controller is configured to adjust the flow of working thermal fluid to the heat exchanger from the heat exchanger reservoir based on the temperature of the heated fuel line,
wherein the first fuel line connector is connected to the fuel supply line on the fuel line upstream of the heat exchanger and is configured to provide fuel to the heat exchanger, and
wherein the second fuel line connector is connected to the heated fuel line on the fuel line downstream of the heat exchanger.

9. The apparatus of claim 8, wherein the engine is a diesel engine.

10. The apparatus of claim 9, wherein the second fuel line connector and heated fuel line are configured to supply heated fuel from the heat exchanger to the engine.

11. The apparatus of claim 10, further comprising a fuel filter disposed on the fuel line upstream of the heat exchanger, wherein the support rod is disposed inside the fuel filter.

12. The apparatus of claim 11, wherein the heat exchanger is configured to improve the fuel efficiency of the engine by heating fuel passing through the heat exchanger.

13. The apparatus of claim 9, wherein the heat exchanger is configured to improve the fuel efficiency of the engine by heating fuel passing through the heat exchanger.

14. The apparatus of claim 12, wherein the heat exchanger is configured to increase the temperature of the fuel passing through the heat exchanger by up to forty degrees F.

15. The apparatus of claim 13, wherein the heat exchanger is configured to increase the temperature of the fuel passing through the heat exchanger by up to forty degrees F.

16. The apparatus of claim 12, wherein the heat exchanger is configured to heat the fuel passing through the heat exchanger to a temperature between about 180 degrees F. and about 210 degrees F.

17. The apparatus of claim 13, wherein the heat exchanger is configured to heat the fuel passing through the heat exchanger to a temperature between about 180 degrees F. and about 210 degrees F.

\* \* \* \* \*